Aug. 22, 1939.  E. E. WEMP  2,170,171
CLUTCH CONTROL APPARATUS
Original Filed Jan. 26, 1938    2 Sheets-Sheet 1
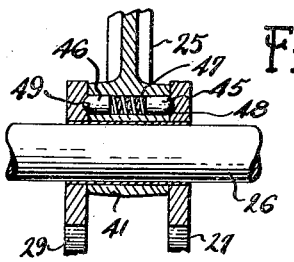
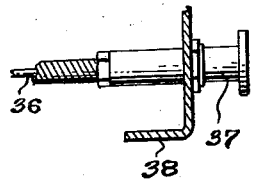
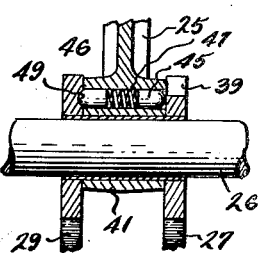
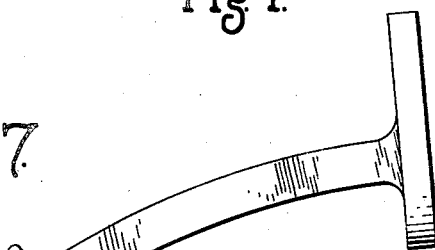
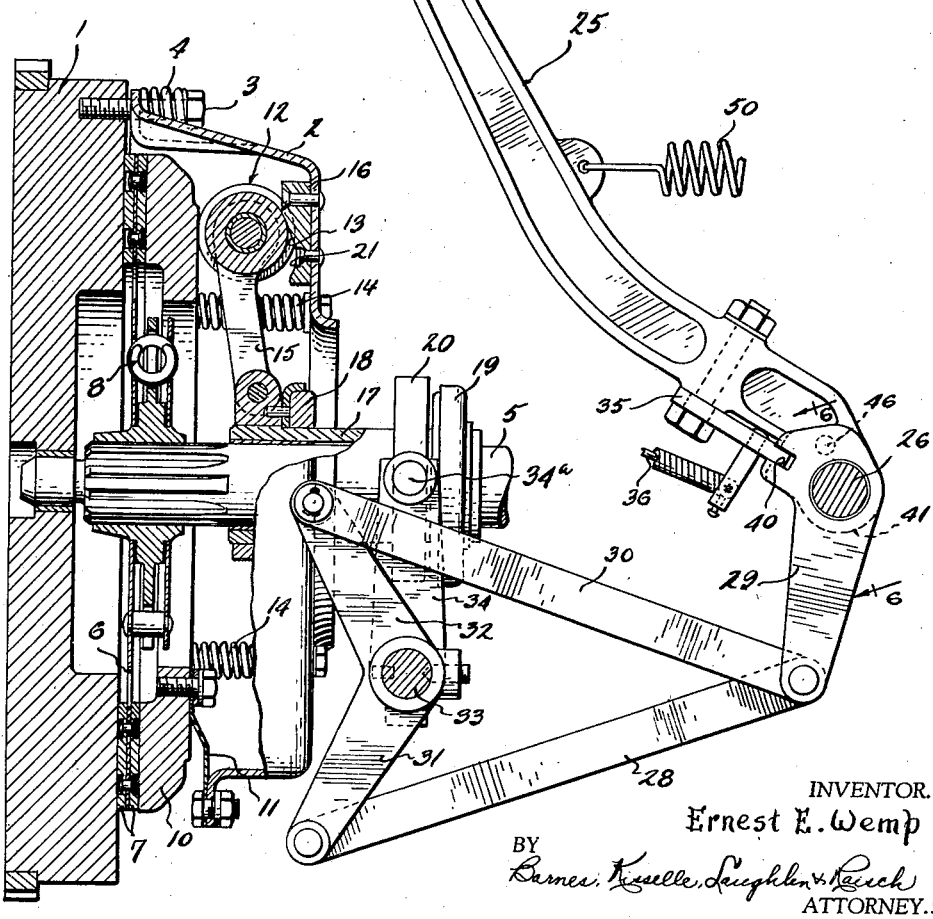
INVENTOR.
Ernest E. Wemp
BY
ATTORNEY.S Aug. 22, 1939.   E. E. WEMP   2,170,171
CLUTCH CONTROL APPARATUS
Original Filed Jan. 26, 1938   2 Sheets-Sheet 2
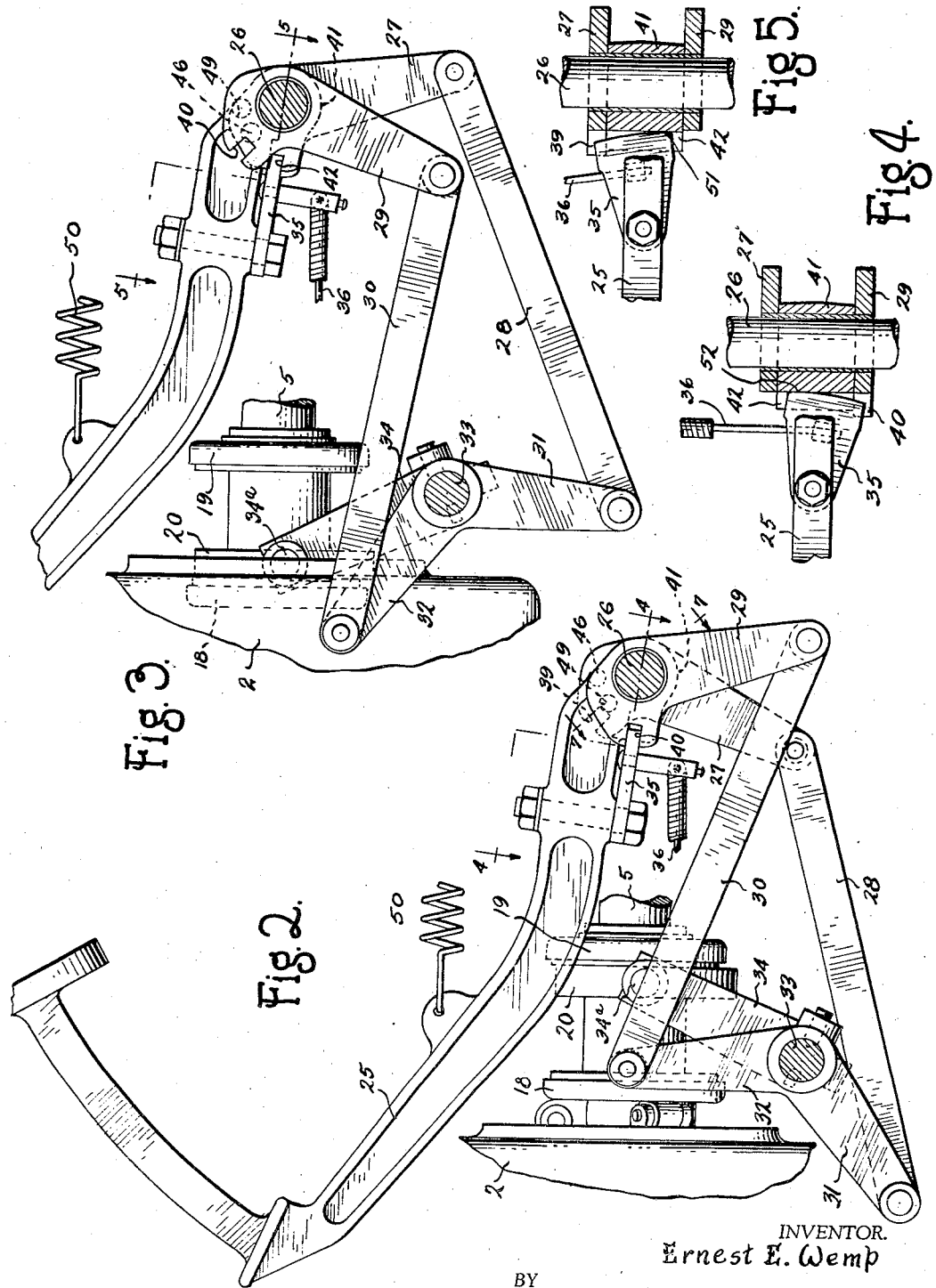
INVENTOR.
Ernest E. Wemp
BY
Barnes, Kisselle, Laughlin & Raisch
ATTORNEYS Patented Aug. 22, 1939

2,170,171

UNITED STATES PATENT OFFICE 2,170,171

CLUTCH CONTROL APPARATUS

Ernest E. Wemp, Detroit, Mich.

Original application January 26, 1938, Serial No. 186,936. Divided and this application March 3, 1938, Serial No. 193,719

11 Claims. (Cl. 192—99)

This invention relates to a clutch control apparatus. It has to do particularly with a control where control forces in opposite directions are required to be applied to the clutch. This application is a division of application Serial Number 186,936, filed January 26, 1938.

The particular clutch shown herein to exemplify the control is a centrifugal type of clutch which forms the basis of a separate application. To control this clutch or others of a similar nature, forces must be applied thereto in one direction at certain times and in the opposite direction at other times. In accordance with the invention a control mechanism is provided wherein these oppositely directed forces may be applied to the clutch by an element such as the clutch pedal to which operating forces are applied in only one direction. The forces are transmitted from the pedal to the clutch through mechanism capable of reversing the direction in which the forces are applied to the clutch.

In the accompanying drawings:

Fig. 1 is a general view illustrating one form of clutch which may be used with the control mechanism and illustrating the control apparatus associated therewith.

Fig. 2 is a general view of the control apparatus showing the pedal substantially in one of its extreme positions with the forces applied to the clutch in one direction.

Fig. 3 is a view similar to Fig. 2 showing the forces applied to the clutch in the opposite direction.

Fig. 4 is a sectional view taken substantially on line 4—4 of Fig. 2.

Fig. 5 is a sectional view taken substantially on line 5—5 of Fig. 3.

Fig. 6 is a sectional view taken substantially on line 6—6 of Fig. 1.

Fig. 7 is a sectional view taken substantially on line 7—7 of Fig. 2.

The clutch as illustrated includes a flywheel 1 to which a cover plate 2 is attached by cap screws 3 with interposed springs 4. The springs 4 permit the cover plate to back away from the flywheel. A driven shaft is shown at 5 on which is mounted a driven disc 6 with suitable facing elements 7, the disc being connected to the driven shaft in any suitable way, as for example, by a vibration dampening construction generally illustrated at 8. A pressure plate is shown at 10 carried by the cover plate through the means of a plurality of steel spring segments or plates 11. These plates serve to drive and center the pressure plate from the cover plate and serve to permit the pressure plate to shift axially.

Centrifugal weight means in the form of roller assemblies 12 function on surfaces of the pressure plate and upon the inclined surface 13 of inserts 16 on the cover plate. The roller assemblies are driven by reason of roller 12 overlapping the edges of the inserts 16. The roller assemblies may be provided in suitable numbers, and each assembly has a link 15 pivotally connected to a sleeve 17 which is axially shiftable and which is provided with bearings or collars 18 and 19 which are axially spaced relative to each other. A control collar 20 is located between the bearing collars 18 and 19.

As shown in Fig. 1 the clutch is engaged. At normal idling speed of the engine the roller assemblies 12 lie in the deepest part 21 of the recesses in the inserts 16 and the clutch will be disengaged. The clutch may be held normally disengaged by retractor springs 14 connected to the cover plate and pressure plate although the flexible plates 11 may be arranged to normally retract the pressure plate. At this time the sleeve 17 will be shifted to the right, and the inner ends of the links 15 will, of course, follow the sleeve 17. As the engine is accelerated above idling speed the roller assemblies shift outwardly to the position shown in Fig. 1. The roller assemblies function on the inclined surface 13 and urge the pressure plate 10 to the left as Fig. 1 is viewed to pack the driven disc between the flywheel and the pressure plate. The springs 4 may be compressed to let the cover plate back away in taking the reaction. When fully engaged the link 15 assumes an irreversible angle so that the clutch remains engaged even when the engine is reduced to idling speed or brought to a complete stop. The clutch may be disengaged manually by shifting the collar 20 to the right as Fig. 1 is viewed; in this action the collar 20 engages the bearing 19 and shifts the sleeve 17 to the right, thus breaking the irreversible angle and causing clutch disengagement. The clutch may be engaged independently of centrifugal force by moving the collar to the left, in which action it engages the bearing 18 and forces the roller assemblies outwardly into the position as shown in Fig. 1.

As mentioned above this particular clutch construction is covered in a separate application, and it is shown therein to provide an environment for the form of control means covered herein, although a clutch of this general nature enters into the combination with the control mechanism.

The control mechanism may take the form of a rather conventional type of clutch pedal 25 which is journaled on a shaft or stud 26. Also journaled on the stud 26 are two arms, one of which, as at 27, is connected to a link 28, and the other of which, 29, is connected to a link 30. The links 28 and 30 are connected to the opposite arms 31 and 32 of a cross member which is fixed to a clutch rocker shaft 33. A yoke 34 is likewise fixed to the clutch rocker shaft and is connected to the control collar 20 as at 34a.

Means are provided for operatively connecting the pedal 25 with either one of the arms 27 and 29 optionally. To this end the lever is provided with a pivoted latch 35 arranged to be shifted on its pivot by suitable control means. Such a control means may take the form of a Bowden wire 36, one end of which is connected to the latch as shown in Fig. 4, and the other end of which may be equipped with a control button 37 mounted in a suitable convenient place, as for example, on the instrument panel 38 of the vehicle. The arm 27 has a notch 39 for receiving the latch, and the arm 29 has a notch 40 for receiving the latch while the hub 41 of the lever has a slot 42 in which the latch functions.

The latch may be shifted by means of the Bowden wire to and from the extreme positions shown in Figs. 4 and 5. In one position it locks the pedal to the arm 27; in the other position it locks the pedal to the arm 29.

As illustrated in Figs. 6 and 7 a detent arrangement is employed, and this may take the form of spring pressed plungers 45 and 46 with an interposed spring 47, all situated in a bore in the hub in the pedal and the detents are arranged to seat in notches 48 and 49 in the two arms. When the two arms are in alignment, as shown in Fig. 1, the plungers seat in the recesses as shown in Fig. 6 to hold the arms in this position. At this time the notches 39, 40 and groove 42 are in alignment.

The normal position of the clutch operating apparatus is illustrated in Fig. 1 in which position the lever may be retracted by a spring 50. The two arms 27 and 29 are in substantial alignment. The preferred normal position of the latch 35 is that position shown in Fig. 4 wherein the arm 29 is keyed to the clutch pedal. Any time the clutch is engaged as shown in Fig. 1 the pedal may be depressed to disengage the clutch. In this action the pedal swings counter-clockwise as Figs. 1 and 2 are viewed, and the arm 29 moves likewise. The link 30 acts as a tension member and rocks the shaft 33 and the yoke 34 clockwise. This shifts the collar 20 to the right, and it in turn engages the bearing 19. A substantially maximum depression of the pedal is shown in Fig. 2, but normally this amount of movement is not necessary. The pedal need only be pushed down far enough to break the irreversible angle of the links 15 to initiate clutch disengaging action, and then disengagement continues by continued movement of the sleeve 17 to the right. In the normal operation of the vehicle the clutch engages as the engine is accelerated above idling speed and only one engagement is needed where an automatic transmission is used. When the vehicle moves up to a traffic light, for example, and the engine approaches idling speed, all the operator has to do is to slightly depress the pedal to cause clutch disengagement. Of course, if the operator desires to manually disengage the clutch, at relatively high R. P. M. where the clutch tends to stay engaged centrifugally, the pedal 25 may be pushed substantially all the way down as Fig. 2 is viewed, and the collar 20 shifts the sleeve 17 to the right and holds it to the right.

Now it may be desirable to manually engage the clutch when the engine is at rest in order to push or tow the vehicle to start the engine or in order that the car may be placed in gear with the clutch engaged while it is parked. To do this the operator may shift on the button 37 of the Bowden wire to shift the latch to the Fig. 5 position. Now when the pedal is pushed down, as illustrated in Fig. 3, the arm 27 is rocked and the tension member 28 causes the rock shaft 33 to turn counter-clockwise, and the collar 20 pushes the sleeve to the left to cause clutch engagement. The pedal may now be released and it moves back to the Fig. 1 position, there being sufficient distance between the bearings 18 and 19 to permit of this action.

In the normal position of the parts the plungers 46 and 48 seat in the recess and hold the arms 27 and 29 in proper alignment, and this is the only time that the latch 35 can be actuated from one position to the other. The movement of the latch may be limited by striking the bottom surface of the slot 42, as illustrated at points 51 and 52. The action of engaging the clutch manually is a more infrequent operation than that of disengaging the clutch, and it is for this reason that the preferred normal position of the latch 35 is that of connecting the clutch release arm 29 to the pedal.

Thus it will be noted that a clutch controlling apparatus is provided for transmitting controlling forces to a clutch in opposite directions, but the force delivered by the operator is in one direction, as for example, by pushing a clutch pedal.

I claim:

1. In combination with a clutch requiring controlling forces to be delivered thereto in substantially opposite directions, a movable control member, a shiftable member operably associated with the clutch, means connecting the control member and shiftable member for transmitting movements to the shiftable member, and means operable at will for conditioning the connecting means for shifting the shiftable member in one direction or the substantially opposite direction upon control movement of the control member in one direction.

2. In combination with a clutch of an automotive vehicle requiring controlling forces to be delivered thereto in substantially opposite directions, a normally retracted clutch pedal arranged to be depressed for controlling action, a shiftable member operably associated with the clutch, means connecting the clutch pedal and the shiftable member for transmitting movement to the shiftable member when the pedal is depressed, and means operable at will for conditioning the connecting means for shifting the shiftable member in one direction or the substantially opposite direction upon the depressing of the clutch pedal.

3. In combination with a clutch of an automotive vehicle requiring controlling forces to be delivered thereto in substantially opposite directions, a clutch pedal arranged to be depressed by the operator, a shiftable member operatively associated with the clutch, a first means operably associated with the shiftable member arranged to move the shiftable member in one direction upon depression of the clutch pedal, a second means operably associated with the shiftable member arranged to move the shiftable member in the substantially opposite direction upon depression of the clutch pedal, and means for establishing a connection optionally between the pedal and the first and second means.

4. In combination with a clutch of an automotive vehicle requiring controlling forces to be delivered thereto in substantially opposite directions, a clutch pedal arranged to be depressed by the operator, a shiftable member operatively associated with the clutch, a first means operably associated with the shiftable member arranged to move the shiftable member in one direction upon depression of the clutch pedal, a second means operably associated with the shiftable member arranged to move the shiftable member in the substantially opposite direction upon depression of the clutch pedal, and means shiftable at will by the operator for establishing a connection optionally between the pedal and the first and second means.

5. In combination with a clutch of an automotive vehicle requiring controlling forces to be delivered thereto in substantially opposite directions, a clutch pedal arranged to be depressed for clutch control, a shiftable member operably associated with the clutch, means for moving the shiftable member in one direction including a pivotally mounted arm, means for moving the shiftable member in substantially the opposite direction including a second pivotally mounted arm, and means operable at will for optionally connecting the pedal to the first and second mentioned arms.

6. In combination with a clutch of an automotive vehicle requiring controlling forces to be delivered thereto in substantially opposite directions, a clutch pedal arranged to be depressed for clutch control, a shiftable member operably associated with the clutch, means for moving the shiftable member in one direction including a pivotally mounted arm, means for moving the shiftable member in substantially the opposite direction including a second pivotally mounted arm, and a latch pivotally mounted on the pedal and shiftable optionally into latching engagement with the first and second mentioned arms.

7. In combination with a clutch of an automotive vehicle requiring controlling forces to be delivered thereto in substantially opposite directions, a clutch pedal arranged to be depressed for clutch control, a shiftable member operably associated with the clutch, means for moving the shiftable member in one direction including a pivotally mounted arm, means for moving the shiftable member in substantially the opposite direction including a second pivotally mounted arm, means for holding the two arms in a predetermined relative relation, a latch carried by the pedal and movable to interengage the pedal optionally with the first and second mentioned arms while said arms are in said predetermined relationship.

8. Clutch controlling means comprising a shiftable control member, a rock shaft to which the control member is operatively connected, a cross member on the rock shaft having portions projecting to opposite sides of the rock shaft, links connecting to said portions of the cross member, two pivotally mounted arms respectively connected to the links, a clutch pedal arranged to be depressed for clutch control, and a latch operable at will to connect the pedal optionally with the said arms whereby movement of the pedal when depressed may shift the control member optionally in opposite directions.

9. Clutch controling means comprising a shiftable control member, a rock shaft to which the control member is operatively connected, a cross member on the rock shaft having portions projecting to opposite sides of the rock shaft, links connecting to said portions of the cross member, two pivotally mounted arms respectively connected to the links, a clutch pedal arranged to be depressed for clutch control, a latch member pivotally mounted on the pedal and operating in a slot in the pedal, each of the two arms having a notch for optionally receiving the latch whereby movement of the pedal may shift the control member optionally in substantially opposite directions.

10. Clutch controlling means comprising a shiftable control member, a rock shaft to which the control member is operatively connected, a cross member on the rock shaft having portions projecting to opposite sides of the rock shaft, links connecting to said portions of the cross member, two pivotally mounted arms respectively connected to the links, a clutch pedal arranged to be depressed for clutch control, a latch member pivotally mounted on the pedal and operating in a slot in the pedal, each of the two arms having a notch for optionally receiving the latch whereby movement of the pedal may shift the control member optionally in substantially opposite directions, and means interassociating the two arms and normally holding them in a position with the notches in alignment with the slot.

11. In an automotive vehicle, the combination of a clutch requiring controlling movements to be delivered thereto in substantially opposite directions, a clutch pedal arranged to be depressed for clutch control, two pivotally mounted arms each connected to the control member so that pivotal movement of one arm shifts the control member in one direction and like pivotal movement of the other arm shifts the control member in the opposite direction, latch means, and means connected to the latch means and operable at will at an accessible location remote from the latch means to connect the pedal optionally with the said two arms.

ERNEST E. WEMP.